United States Patent [19]

Daw et al.

[11] Patent Number: 4,558,892
[45] Date of Patent: Dec. 17, 1985

[54] DUCT ASSEMBLY SYSTEM

[75] Inventors: David E. Daw, Los Angeles; Arthur F. Vlastnik, Cardiff-by-the-Sea, both of Calif.

[73] Assignee: Quikduc of California, Inc., Los Angeles, Calif.

[21] Appl. No.: 552,098

[22] Filed: Nov. 16, 1983

[51] Int. Cl.$^4$ .............................................. F16L 23/00
[52] U.S. Cl. .................................. 285/331; 285/363; 285/424
[58] Field of Search ............... 285/363 X, 424 X, 331, 285/405, 364

[56] References Cited

U.S. PATENT DOCUMENTS

| 565,499 | 8/1896 | Pattison | 285/404 |
|---|---|---|---|
| 2,498,753 | 2/1950 | Deitsch | 285/64 |
| 3,199,901 | 8/1965 | Jeppsson | 285/424 |
| 3,415,543 | 12/1968 | Keating | 285/24 |
| 3,460,859 | 8/1969 | Keating | 285/319 |
| 3,482,861 | 12/1969 | Keating | 285/399 |
| 3,712,650 | 1/1973 | Mez | 285/405 |
| 3,923,326 | 12/1975 | Mez | 285/363 |
| 4,046,409 | 9/1977 | Virgin | 285/305 |
| 4,123,094 | 10/1978 | Smitka | 285/405 |
| 4,218,079 | 8/1980 | Arnoldt | 285/331 |
| 4,244,609 | 1/1981 | Smitka | 285/405 |
| 4,252,350 | 2/1981 | Smitka | 285/363 |
| 4,288,115 | 9/1981 | Sullivan | 285/363 |
| 4,410,206 | 10/1983 | Mez | 285/405 |

FOREIGN PATENT DOCUMENTS

2138966 2/1973 Fed. Rep. of Germany.
2434180 7/1974 Fed. Rep. of Germany ...... 285/424

Primary Examiner—Cornelius J. Husar
Assistant Examiner—Eric K. Nicholson
Attorney, Agent, or Firm—Emrich & Dithmar

[57] ABSTRACT

A duct assembly system for joining duct sections each having a plurality of flat intersecting walls includes angle member connectors respectively associated with the duct walls, each connector being generally L-shaped with one leg portion extending perpendicular to the duct wall and having an elongated channel formed therein and the other leg portion comprising two biased-together flanges adapted for frictionally receiving the adjacent duct wall edge therebetween, each flange having elongated ridges which interlock with elongated ribs on the associated duct wall. Each duct wall edge is embedded in a mastic sealant in a trough in the associated connector, the trough having diverging sides for guiding the duct wall edge thereinto. Connectors on intersecting duct walls are joined by corner members formed of sheet metal and flanged for rigidity and tight fit in the connector channels. Each corner member has flanges for gripping the channel edges of the joined connectors. Adjacent corner members on the two duct sections are joined by fasteners and a gasket may be disposed between the duct sections.

28 Claims, 12 Drawing Figures

DUCT ASSEMBLY SYSTEM

BACKGROUND OF THE INVENTION

The present invention relates to systems for joining together the ends of adjacent duct sections, such as heating and air-conditioning ducts or the like. Such systems typically include generally L-section connectors respectively fastened to the end edges of each of the duct walls, each connector having a leg portion which projects outwardly from the duct wall perpendicular thereto and defines an elongated channel. The channels of connectors on intersecting duct walls respectively receive therein the legs of a corner member. The corner members on the adjacent duct sections are then fastened together. A suitable gasket may be disposed between the duct sections.

Prior systems have been relatively expensive to manufacture and difficult to install. Many such systems have required that the connectors be secured to the duct walls by numerous fasteners or spot welds, either of which entails costly and time consuming labor. Some systems have utilized tabs on the duct walls which engage lips on the connectors to inhibit separation of the duct walls from the connectors. The lip is on a flexible portion of the connector to facilitate engagement, but this same flexibility could also permit disengagement when the duct system was subjected to certain stresses. Furthermore, the duct wall is pierced to form the tabs, resulting in air leakage at the tabs.

Many systems provide inadequate sealing at the joint between the duct sections, permitting escape of air from the duct. In some prior systems the connector carries a body of mastic sealant material into which the associated duct edge is embedded. These systems have had connector constructions which make it difficult to install the sealant and which do not facilitate insertion of the duct edge thereinto. Improper seating of the duct edge in the sealant permits leakage. Also, where a gasket is used it does not adhere well to the corner members of prior systems, resulting in leakage at the corners of the duct joints, particularly in pressurized systems. With the ever-increasing emphasis on energy conservation, leakage is an increasingly significant problem. Duct assembly systems and, particularly, the corner members thereof, must have sufficient strength and rigidity to meet construction industry standards and to prevent deformation during handling, assembly or use of the duct system. Yet, at the same time, such assembly systems should be lightweight to minimize the cost of construction and to minimize the loads placed on the associated building. The corner members of prior systems have typically been constructed of expensive, heavy-gauge material or have lacked the strength required by industry standards.

SUMMARY OF THE INVENTION

The present invention relates to an improved duct assembly system which avoids the disadvantages of prior systems while affording additional structural and operating advantages.

It is a general object of this invention to provide a duct assembly system which is of simple and economical construction, being formed of relatively thin gauge material, but having sufficient strength to meet industry standards.

It is another object of this invention to provide a duct assembly system of the type set forth which provides for simple, yet effective, interlocking of the connectors with the duct edges.

In connection with the foregoing object, yet another object of this invention is the provision of a duct assembly system which effectively prevents deflection of the connectors after assembly which might cause disengagement of the duct edges therefrom.

Still another object of this invention is the provision of a duct assembly system of the type set forth, which provides a mastic sealant trough in the connector, shaped and dimensioned to facilitate guiding of the duct edge thereinto.

Another object of this invention is the provision of a duct assembly system which minimizes air leakage.

Yet another object of this invention is the provision of an improved angle member connector for use in a duct assembly system of the type set forth.

Still another object of this invention is the provision of an improved corner member for use in a duct assembly system of the type set forth.

These and other objects of the invention are attained by providing a duct assembly system for joining the ends of adjacent duct sections, each having a plurality of duct walls meeting at duct corners, the system comprising: a plurality of elongated generally L-shaped angle member connectors respectively associated with the duct walls of both duct sections, each of the connectors including two generally perpendicular leg portions, one of the leg portions including two flexible flanges resiliently biased together and adapted for receiving therebetween the distal edge of the associated duct wall; each of the duct walls having an elongated continuous rib projecting from the plane thereof and extending substantially parallel to the distal edge thereof and engageable with one of the flexible flanges of the associated connector upon insertion between the flexible flanges for interlocking the duct wall and the connectors; and means interconnecting the connectors on each duct section and connecting the connectors on one duct section respectively with the corresponding connectors on the other duct section securely to hold the duct sections together.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figures 1, 2, 3:
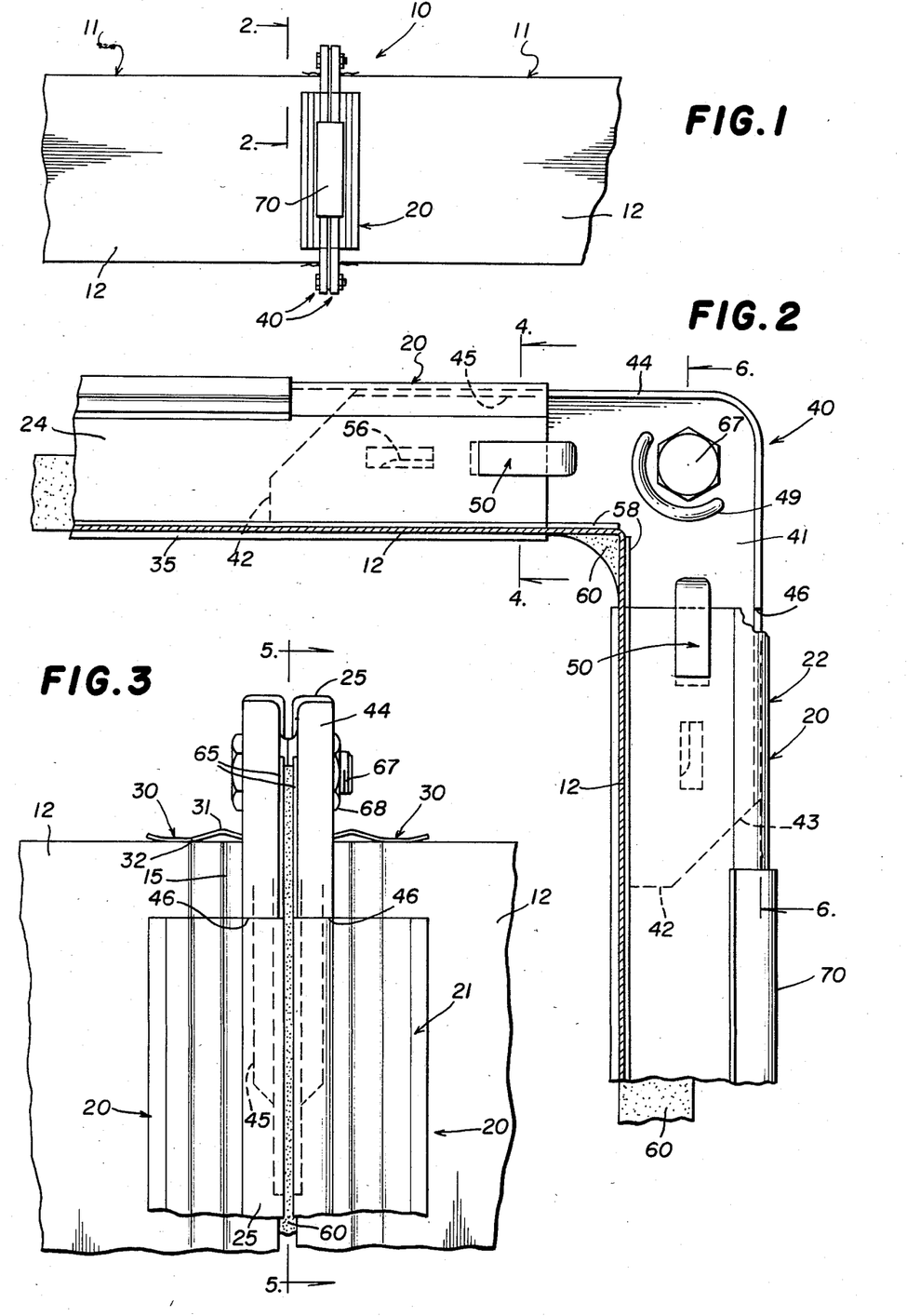
FIG. 1 is a fragmentary, side elevational view of two adjacent duct sections joined by a duct assembly system constructed in accordance with and embodying the features of the present invention.
FIG. 2 is an enlarged, fragmentary view in vertical section of one corner of the duct assembly system of FIG. 1, taken generally along the line 2—2 in FIG. 1.
FIG. 3 is a fragmentary, side elevational view of the portion of the assembly illustrated in FIG. 2, as viewed from the right-hand side thereof.
Figure 4:
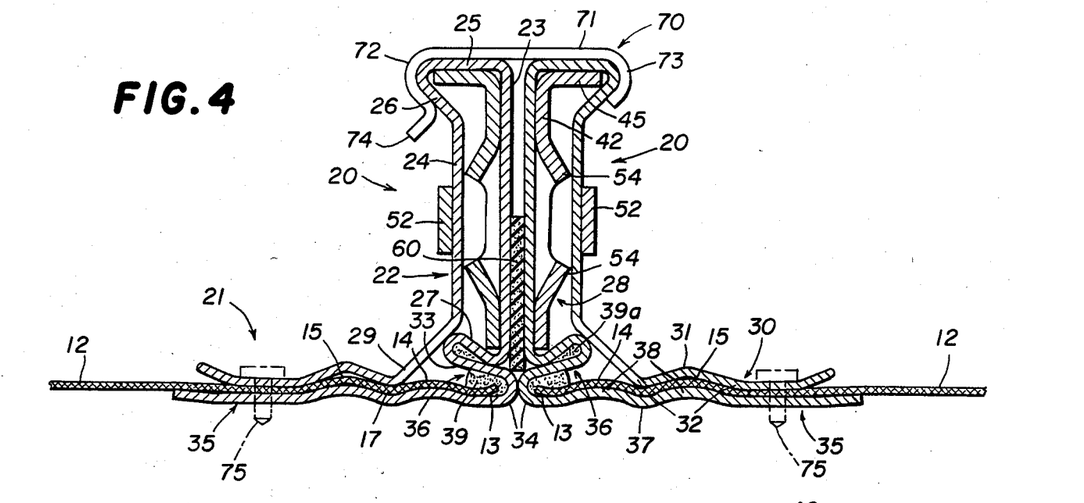
FIG. 4 is a further enlarged, fragmentary view in vertical section taken along the line 4—4 in FIG. 2.
Figures 5, 6, 7:
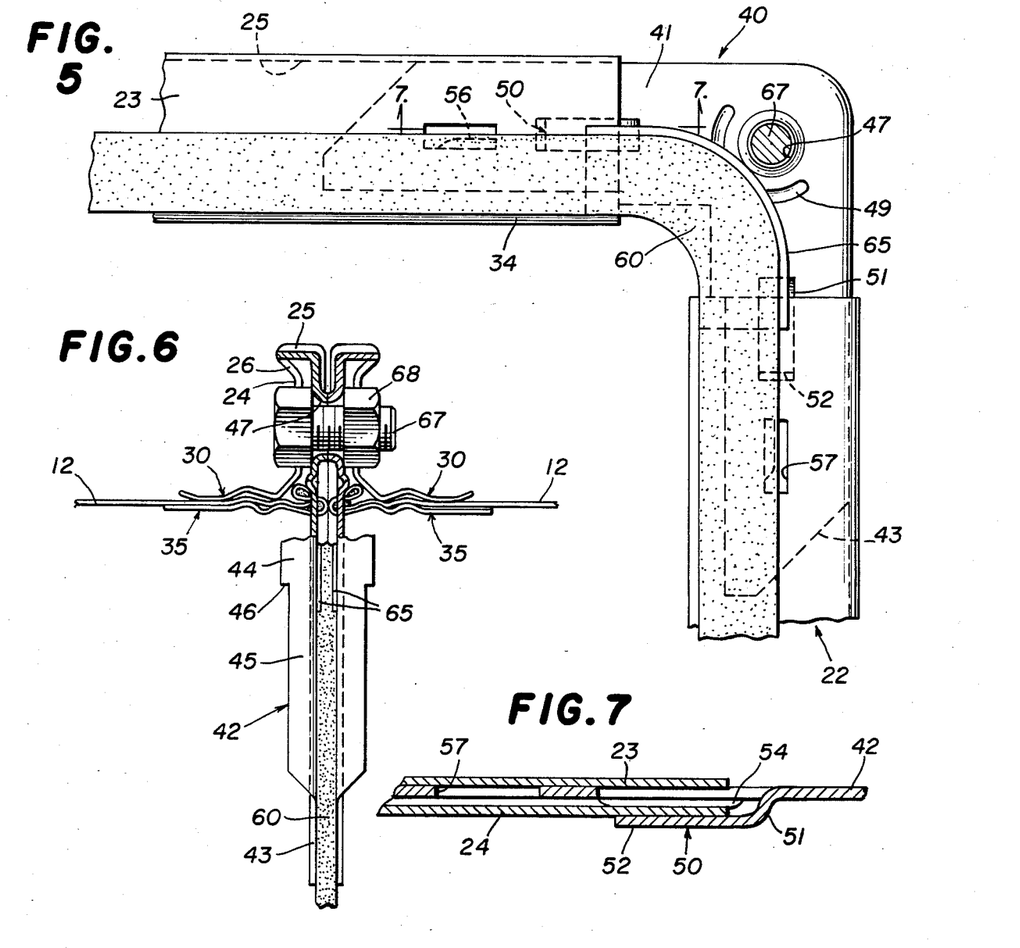
FIG. 5 is a fragmentary sectional view taken along the line 5—5 in FIG. 3.
FIG. 6 is a fragmentary view in vertical section taken along the line 6—6 in FIG. 2.
FIG. 7 is a further enlarged, fragmentary sectional view taken along the line 7—7 in FIG. 5.

Referring to FIG. 1 of the drawings, there is illustrated a duct assembly system, generally designated by the numeral 10, for joining the adjacent ends of two duct rectangular sections 11, each having four intersecting duct walls 12, respectively terminating in distal end edges 13 (see FIG. 4). Each of the duct walls 12 has formed therein adjacent to the distal end edge 13 thereof and extending substantially the length thereof, two elongated ribs 14 and 15, which are generally arcuate in transverse cross section (see FIG. 4). The ribs 14 and 15 define therebetween a valley, the inner surface of which forms a rib 17. The distal end edge 13 projects a slight distance outwardly of the plane of the duct wall 12. The ribs 14 and 15 are formed without piercing the associated duct wall 12, i.e., the duct wall 12 is continuous in the area of the ribs 14 and 15 to prevent escape of air from the duct section 11.

Referring now also to FIGS. 2 through 6 of the drawings, the duct assembly system 10 includes, for each duct section 11, four angle member connectors 20, respectively associated with the duct walls 12, and four corner members 40, respectively associated with the corners of the duct section 11. Each of the angle member connectors 20 is an elongated, generally L-shaped sheet metal section of unitary, one-piece construction, having a length slightly less than that of the distal end edge 13 of the associated duct wall 12. Referring in particular to FIG. 4, the connector 20 includes two generally perpendicular leg portions 21 and 22, the former being disposed in use substantially parallel to the associated duct wall 12 and the latter being disposed in use substantially perpendicular to the duct wall 12 and extending laterally outwardly therefrom. The leg portion 22 includes spaced-apart, parallel side walls 23 and 24, the former being longer than the latter and provided at the outer end thereof with an end wall 25 extending therefrom normal thereto in the direction of the side wall 24. An inclined wall portion 26 interconnects the outer ends of the end wall 25 and the side wall 24. The inner end of the side wall 23 is provided with an inner wall 27 extending upwardly therefrom at an acute angle thereto toward the side wall 24. The walls 23-27 cooperate to define therebetween a channel 28 which extends the length of the connector 20 and is open at the ends thereof.

The leg portion 21 includes a flexible flange 30, having the inner end thereof connected by an inclined wall portion 29 with the inner end of the side wall 24. The flange 30 is deformed along the entire length thereof to define an outwardly projecting ridge 31 disposed between two inwardly projecting ridges 32, the ridges 31 and 32 all having longitudinal axes extending substantially parallel to the side wall 23. One of the inwardly projecting ridges 32 is substantially continuous with the inclined wall portion 29, while the other is spaced a predetermined distance from the distal edge of the flange 30.

The leg portion 21 also includes an inclined wall 33 which depends from the inner wall 27. The outer end of the inclined wall 33 is connected by a curved bearing portion 34 to a flexible flange 35 for cooperation therewith to define therebetween a trough 36 extending the length of the connector 20. The bearing portion 34 projects outwardly a predetermined distance beyond the plane of the side wall 23. The flange 35 extends outwardly alongside, and a slight distance beyond the outer end of, the flange 30. The flange 35 is deformed to define an outwardly projecting ridge 37 disposed between two inwardly projecting ridges 38, all having longitudinal axes extending the length of the flange 35 substantially parallel to the side walls 23 and 24.

The flanges 30 and 35 are normally biased together, with the ridges 37 and 38 being positioned so that the outer or leading slopes thereof respectively engage the inner or trailing slopes of the ridges 32. In this normal rest position, the distal ends of the flanges 30 and 35 diverge slightly. A body 39 of mastic sealant is disposed in the trough 36 along the entire length thereof. The inner wall 27 and the inclined wall 33 are inclined with respect to each other, being in contact adjacent to their outer edges and cooperating to define therebetween a trough extending the length of the angle member connector 20 and in which is disposed a body 39a of mastic sealant. Preferably, the bodies 39 and 39a of mastic sealant are rolled in place during the fabrication of the angle member connector 20.

In use, the angle member connectors 20 are mounted on the duct walls 12 of each of the duct sections 11 by inserting the distal end edge 13 of each duct wall 12 between the flanges 30 and 35 of the corresponding angle member connector 20, as illustrated in FIG. 4. The flanges 30 and 35 will resiliently deflect apart to permit this insertion and to permit camming of the ribs 14, 15 and 17 on the duct wall 12 past the ridges 31 and 32 on the flange 30 and the ridges 37 and 38 on the flange 35. Once the rib 14 has cammed past the ridges 32, the flanges 30 and 35 will spring back into tight engagement with the duct wall 12 in an assembled configuration illustrated in FIG. 4. In this assembled configuration, the rib 17 on the duct wall 12 is nested between the ridges 38 on the flange 35. The ribs 14 and 15 on the duct wall 12 are respectively disposed inwardly of the ridges 32 on the flange 30. The normally abutting portions of the outer ones of the ridges 32 and 38 cooperate to grip therebetween the trailing flank of the rib 15, while the normally abutting portions of the inner ones of the ridges 32 and 38 cooperate to grip therebetween the trailing flank of the rib 14, thereby effectively to inhibit disengagement of the duct wall 12 from the connector leg portion 21.

As the duct wall 12 is inserted between the flanges 30 and 35, the distal edge 13 thereof is embedded in the body 39 of mastic sealant to provide an air-tight seal between the duct wall 12 and the angle member connector 20. It will be appreciated that the divergence of the inclined wall 33 and the flange 35 toward the space between the flanges 30 and 35 serves to provide a large volume for the trough 36 and ensure proper fill of the trough 36 with the body 39 of mastic sealant. Also the incline of the wall 33 serves to guide the distal end edge 13 of the duct wall 12 into the trough 36, and prevents the distal end edge 13 from snagging on the end of the wall 33.

Referring now also to FIGS. 7-12, each of the corner members 40 is a sheet metal member of unitary, one-piece construction and includes a flat, plate-like body 41, having two substantially perpendicular legs 42, each being mitered at the distal ends thereof, as at 43. The body 41 is provided with a flange 44 at the outer edge thereof projecting therefrom substantially perpendicular thereto and extending the entire length thereof from the distal end of one leg 42 to the distal end of the other leg 42. The flange 44 has two end portions 45 of reduced width, the junctions between these end portions 45 and the main body of the flange 44 defining two stop shoulders 46. The width of the end portions 45 is slightly less than the width of the end wall 25 of the angle member connector 20, but is greater than the spacing between the side walls 23 and 24 of the angle member connector 20, so that each end portion 45 will fit snugly within the enlarged outer end of the channel 28 of a corresponding angle member connector 20, as is best seen in FIG. 4 and as will be described more fully below.

Figures 8, 9, 10:
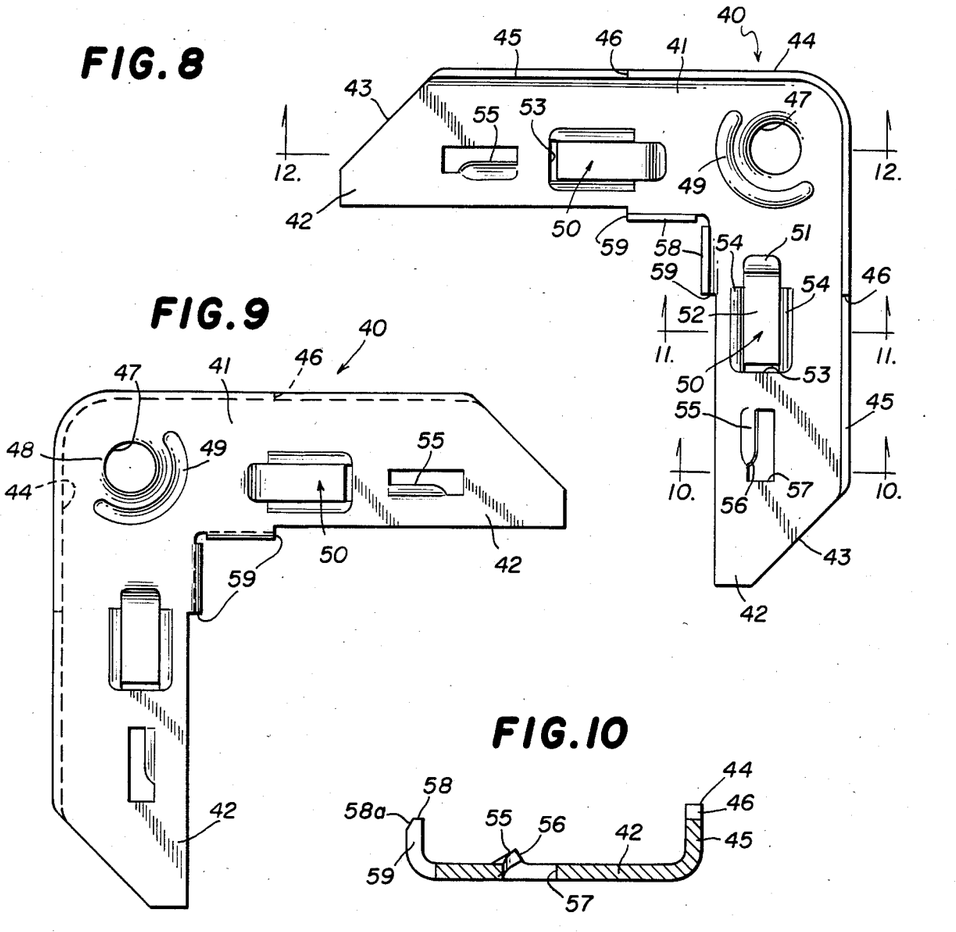
FIG. 8 is an enlarged front elevational view of one of the corner members of the duct assembly system of FIG. 1.
FIG. 9 is a rear elevational view of the corner member of FIG. 8.
FIG. 10 is a further enlarged view in horizontal section taken along the line 10—10 in FIG. 8.

A circular aperture 47 is formed through the body 41 at the junction of the legs 42. Disposed in surrounding relationship with the aperture 47 coaxially therewith and projecting from the body 41 in the opposite direction from the flange 44 is a cylindrical bushing wall 48. Partially encircling the aperture 47 along the inner portion thereof is an arcuate embossment 49 which projects from the plane of the body 41 in the same direction as the flange 44 and cooperates therewith to provide lateral stiffening for the corner member 40.

Each of the legs 42 is provided with an integral flange 50 which is punched or struck therefrom. Each flange 50 includes a connecting portion 51 integral with the associated leg 42 and projecting therefrom in the same direction as the flange 44 in a plane generally perpendicular to the body 41, the connecting portion 51 being in turn integral with an elongated flat rectangular retaining portion 52 disposed generally parallel to the associated leg 42 and spaced a predetermined distance therefrom. The connecting portion 51 is disposed adjacent to the body 41 behind the stop shoulders 46, while the retaining portion 52 extends past the stop shoulders 46 toward the distal end of the associated leg 42, terminating at a point about half way down the length of the leg 42. The punching of each flange 50 from the associated leg 42 leaves therein a rectangular aperture 53, the lateral edges of which are deformed toward the flange 50 to define a pair of ridges 54 which are substantially coplanar in a plane parallel to the inner surface of the associated flange 50 and spaced therefrom for cooperation therewith to define a retaining slot.

Figure 11:
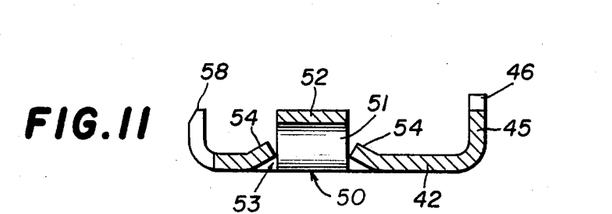
FIG. 11 is a further enlarged view in horizontal section taken along the line 11—11 in FIG. 8.
Figure 12:
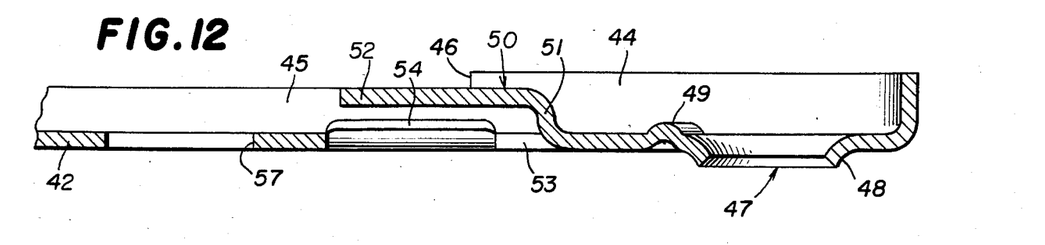
FIG. 12 is a further enlarged fragmentary view in horizontal section taken along the line 12—12 in FIG. 8.

Also punched from each of the legs 42 between the distal end thereof and the flange 50 is a ridge 55 which is substantially coplanar with the ridges 54 and has a beveled leading edge 56 defining a guide surface, the punching of the ridges 55 from the legs 42 leaving generally rectangular apertures 57 therein. The body 41 is provided with a pair of flanges 58 along the inner edges thereof projecting therefrom substantially perpendicular thereto in the same direction as the flange 44. Each flange 58 has the distal end thereof beveled along its outer edge, as at 58a (FIGS. 10 and 11). The flanges 58 respectively terminate at stop shoulders 59 which are respectively substantially coplanar with the stop shoulders 46.

In use, each corner member 40 joins together the adjacent ends of angle member connectors 20 on intersecting walls 12 of a duct section 11 at a corner thereof. More particularly, the legs 42 of the corner member 40 are respectively inserted in the channels 28 of the angle member connectors 20 to be joined. The corner members 40 are dimensioned so that each of the legs 42 has a thickness which, when added to the height of the ridges 54 and 55 is substantially equal to the width of the channel 28 between the inner surfaces of the side walls 23 and 24 of the angle member connectors 20, while the height of the end portions 45 of the flange 44 is slightly less than the width of the inner surface of the end wall 25 of the angle member connector 20, thereby to permit the leg 42 to be snugly received in the channel 28 from one end of the angle member connector 20 (see FIGS. 2, 4 and 5). The thickness of the slot between the ridges 54 and the inner surface of the flange retaining portion 52 is slightly greater than the thickness of the inner side wall 24 of the angle member connector 20 for snugly receiving same, as will be explained in greater detail below.

It is a significant aspect of the present invention that, as the leg 42 is inserted in the associated channel 28, the side wall 24 of the angle member connector 20 is received in the slot between the corresponding flange 50 and associated ridges 54 (see FIGS. 2 and 7), being snugly wedged-fitted thereinto. More specifically, the inner surface of the side wall 24 is guided up on to the ridge 55 by the beveled leading edge 56 thereof for holding the side wall 24 in the proper position for insertion into the slot between the flange 50 and the ridges 54. The stop shoulders 46 and 59 engage the connector 20, respectively at the junction between the end wall 25 and the inclined wall portion 26 and at the inclined wall 33, thereby to limit the depth of insertion of the leg 42 into the channel 28. The flange 50 and associated ridges 54 cooperate fixedly to hold the side wall 24 of the connector 20 in a position spaced a predetermined distance from the side wall 23, and effectively prevent any deflection of the side wall 24 in either direction with respect to the side wall 23. Because the side wall 24 is integral with the flange 30, this also serves to inhibit deflection of the flange 30.

This is significant because, during insertion and removal of the duct wall 12 from the leg portion 21 of the connector 20, the flange 30, the side wall 24 and the inclined wall portion 26 tend to deflect as a unit, pivoting about a point adjacent to the upper end of the inclined wall portion 26. Thus, by holding the side wall 24 against deflection, these parts can no longer deflect as a unit. Similarly the flange 35 tends to deflect with the side wall 23 as a unit. But once the duct sections 11 have been bolted together as explained below, the side walls 23 are effectively held against deflection. Accordingly, in order to remove the duct wall 12 from the leg portion 21 of the connector 20, the flanges 30 and 35 must be deflected with respect to the side walls 24 and 23, respectively, the stiffness of the parts being such that they resist such deflection sufficiently to substantially inhibit separation of the duct wall 12 from the leg portion 21 of the connector 20, once the parts have been fully assembled.

When the corner members 40 have been inserted in the channels 28 of the angle member connectors 20 on each of the duct sections 11, the duct sections 11 are brought together and a gasket 60, which may be in the form of a sealant gasket tape of pliable thermoplastic material with zero to minimum porosity, may, in certain applications, be fitted around the entire perimeter of one of the duct sections 11. More specifically, the gasket 60 is disposed so as to be just outside the planes of the duct walls 12 along substantially the entire length thereof, lying flat against the outer surfaces of the angle member connector side walls 23. But the gasket 60 intersects the planes of the duct walls 12 at the corners of the duct sections 11. More specifically, the gasket 60 is positioned so that the corner portions of the duct wall end edges 13, which project beyond the ends of the connectors 20, engage the gasket 60 to prevent leakage at the corners.

Preferably, the gasket 60 is adhesively secured to the outer surfaces of the side walls 23 of the angle member connectors 20 on one of the duct sections 11 before it is joined to the other duct section 11. In prior systems, it has been found that, while the gasket 60 adheres reasonably well to the side walls 23, it does not adhere well to the corner members 40 at the corners of the assembly. In particular the adhesive, while still wet, would tend to slip at the corners, and the gasket 60 would sometimes slip inwardly of the duct sections 11, sometimes pulling clear of the corner members 40 to expose the corners of the duct wall and end edges 13, resulting in leakage at the corners.

In order to overcome this difficulty, it is a significant aspect of the present invention that there may be provided for the corner members 40 an attachment strip 65 (see FIGS. 3, 5 and 6), which may be adhesively secured to the corner member 40. The attachment strip 65 preferably extends from one arm 42, about midway along the flange 50, to a corresponding point on the other arm 42. The attachment strip 65 is formed of a compressible material, such as a compressible butyl tape. Thus, the attachment strip 65 will have a negligible effect on the overall thickness of the assembly. The outer surface of the attachment strip 65 cooperates with the gasket adhesive to provide extremely good adhesion of the gasket 60 to the attachment strip 65, thereby effectively eliminating the slippage of the gasket 60 at the corner members 40. It will be appreciated that the attachment strips 65 need be applied only to the corner members 40 of that duct section 11 to which the gasket 60 is to be adhesively secured.

When the members are thus positioned with the gasket 60 between the duct sections 11, the abutting corner members 40 at each corner of the joined duct sections 11 are connected together with bolts 67 passed through the aligned apertures 47 and secured by nuts 68. While circular apertures 47 have been illustrated, they could be made oblong with parallel side portions to accommodate square-shouldered carriage bolts. As the nuts 68 are tightened, the duct sections 11 are drawn together. Since the bearing portions 34 are the outermost points on the angle member connectors 20, they are brought into engagement first. Continued tightening of the nuts 68 tends to pivot the angle member connectors 20 slightly about an axis defined by the line of contact of the bearing portions 34, to bring the parts snugly into engagement with the gasket 60. The duct sections 11 will be drawn together until the distal edges of the bushing walls 48 surrounding the bolts 67 are brought into abutting engagement with each other (see FIGS. 3 and 6). This abutment serves to maintain the proper spacing between the other parts of the duct assembly system 10 so as to grip the gasket 60 firmly between the side walls 23 of the angle member connectors 20. It will be appreciated that the gasket 60 serves to cooperate with the mastic sealant bodies 39 and 39a to provide an airtight seal around the entire perimeter of the duct sections 11.

Finally, when the parts have thus been securely fastened together, elongated flexible channel-shaped cleats 70 may be snap-fitted over the outer ends of the abutting leg portions 22 of the angle member connectors 20, as best illustrated in FIG. 4. In this regard, each cleat 70 has a flat, top wall 71 which spans the abutting leg portions 22, curved side walls 72 and 73 which wrap around the edges of the leg portions 22, and a handle flange 74 to facilitate mounting and demounting of the cleat 70, all in a well known manner. The cleats 70 serve to hold the duct sections 11 tightly together along the flat regions thereof between the corners.

It is a significant aspect of the present invention that the interlocking of the ribs 14 and 15 of the duct walls 12 with the ridges 32 and 38 of the connector flanges 30 and 35 provides a secure interlocking of the parts, while permitting simple and relatively low-labor assembly thereof. The flexible flanges 30 and 35 may simply be pushed over the distal end edge 13 of the associated duct wall 12 and, if necessary, may be tapped into place with a mallet. The parts are so configured that the distal end edge 13 of the duct wall 12 is guided without obstruction into the body 39 of mastic sealant in the trough 36. The gripping engagement of the duct wall 12 by the flanges 30 and 35 after mounting of the corner members 40 is sufficiently tight to prevent accidental disassembly of the parts, considerable force being needed to disengage them. The body 39 of mastic sealant cooperates with the distal end edge 13 of the duct wall 12 effectively to provide an airtight seal between the parts.

In normal applications, no fasteners or other tools are necessary in order to secure the parts together. The interlocking engagement between the duct walls 12 and the angle member connectors 20 is sufficiently tight to prevent their disengagement in normal use after the duct system has been installed. However, it is the practice in some large commercial installations to preassemble several duct sections 11 on the ground and then hoist them as a unit into place on the building being constructed. The combined weight of an assembly of several such duct sections 11 may be considerable, particularly in the case of large ducts. This great weight may tend to pull the duct walls 12 from between the flanges 30 and 35 of the angle member connectors 20 during the hoisting operation. In such cases, fasteners such as sheet metal screws 75 (see FIG. 4) may be utilized to secure the duct walls 12 to the flanges 30 and 35. It has been found that four such screws on each duct section 11 (two screws on each of two opposed duct walls with the screws respectively adjacent to the corners of the duct section) are sufficient to prevent disengagement during hoisting.

The duct assembly system 10 is particularly advantageous in preventing leakage in pressurized systems. In such pressurized systems, the duct walls 12 tend to bow outwardly, with the maximum deflection being midway between the lateral edges of each of the duct walls 12. In such event, the outward deflection of the duct wall 12 tends to push the distal end edge 13 thereof even more firmly into the body 39 of mastic, improving the seal therebetween. In applications where the gasket 60 is used, its inner edge may tend to ride up along the outer side walls 23 of the angle member connectors 20, permitting air to flow up into the space between the inner wall 27 and the inclined wall 33 (see FIG. 4). The body 39a of mastic sealant in the trough between these walls prevents air from flowing therein longitudinally of the angle member connector 20 and escaping at the corners.

The unique construction of the corner members 40 gives them considerable rigidity and strength, while at the same time permitting them to be made of relatively light gauge material. Also, the beveled leading edges 56 of the ridges 55 and the beveled portions 58a of the flanges 58 serve to guide the arms 42 on insertion into the channels 28 of the angle members 20, and to guide the flanges 58 over the adjacent ends of the duct walls 12 without obstruction or interference.

In a constructional model of the present invention, the angle member connectors 20 and the corner members 40 are formed of sheet metal, and the cleats 70 may be formed of plastic. The use of the gasket 60 and the attachment strips 65 is optional, being desirable primarily in pressurized ductwork of medium to high pressure (pressures ranging from about 2 to 10 inches of water), wherein the leakage is more of a problem than in unpressurized systems. The corner members 40 may be formed of 14 gauge sheet metal, providing extremely lightweight construction while still affording the necessary strength and rigidity.

From the foregoing, it can be seen that there has been provided an improved duct assembly system which permits easy installation, which affords a secure interfitting of the connectors with the duct edges without the use of welding or other fastening means, which affords airtight sealing around the entire perimeter of the joined duct sections, and which provides a high-strength assembly with the use of relatively thin-gauge sheet metal parts.

We claim:

1. A duct assembly system for joining adjacent duct sections, each having a plurality of duct walls terminating at distal edges and meeting at duct corners, said system comprising: a plurality of elongated generally L-shaped angle member connectors respectively associated with the duct walls of both duct sections, each of said connectors including two generally perpendicular leg portions, one of said leg portions including two flexible flanges resiliently biased together and cooperating to define therebetween a channel adapted for receiving therein the distal edge of the associated duct wall; one of said flexible flanges on each of said connectors having an elongated ridge projecting into said channel toward the other one of said flexible flanges and extending generally parallel to the distal edge thereof, each of the duct walls having an elongated continuous rib projecting from the plate thereof without perforation thereof and having a longitudinal axis spaced from and extending substantially parallel to the distal edge thereof, said flexible flanges accommodating cammed movement of said duct wall rib past said ridge when said duct wall is received between said flexible flanges, said rib being engageable with said ridge for interlocking the duct wall and said associated connector; and means interconnecting said connectors on each duct section and connecting the connectors on one duct section respectively with the corresponding connectors on the other duct section securely to hold said duct sections together.

2. The duct assembly system of claim 1, wherein said elongated rib extends substantially the entire length of the distal edge of the associated duct wall.

3. The duct assembly system of claim 1, wherein each of the duct walls has plural parallel ribs and each of said connectors has plural parallel ridges on said one flexible flange thereof.

4. The duct assembly system of claim 1, wherein each of the duct walls has elongated ribs projecting respectively from the opposite sides thereof, each of said flexible flanges of each said connector having at least one elongated ridge thereon projecting inwardly toward the other one of said flanges.

5. Connection means for heating and air-conditioning ducts comprising: a duct section having a plurality of duct walls terminating at distal edges and meeting at duct corners, each of said duct walls having an elongated continuous rib projecting from the plane thereof without perforation thereof and having a longitudinal axis spaced from and substantially parallel to the distal edge thereof, and a plurality of elongated connectors respectively associated with said duct walls, each of said connectors including two flexible flanges resiliently biased together and cooperating to define therebetween a channel adapted for receiving therein the distal edge of the associated duct wall, one of said flexible flanges on each of said connectors having an elongated ridge projecting into said channel toward the other one of said flexible flanges and extending generally parallel to the distal edge thereof, said flexible flanges accommodating cammed movement of said duct wall rib past said ridge when said duct wall is received between said flexible flanges, said rib being engageable with said ridge for interlocking the duct wall and said associated connector.

6. The connection means of claim 5, wherein said elongated rib extends substantially the entire length of the distal edge of the associated duct wall.

7. The connection means of claim 5, wherein each of said duct walls has plural parallel ribs and each of said connectors has plural parallel ridges on said one flexible flange thereof.

8. The connection means of claim 5, wherein each of said duct walls has elongated ribs projecting respectively from the opposite sides thereof, each of said flexible flanges of each said connector having at least one elongated ridge thereon projecting inwardly toward the other one of said flanges.

9. A duct assembly system for joining adjacent duct sections, each having plurality of duct walls terminating at distal edges and meeting at duct corners, said system comprising: a plurality of elongated generally L-shaped angle member connectors respectively associated with the duct walls of both duct sections, each of said connectors including two generally perpendicular leg portions, one of said leg portions including two flexible flanges resiliently biased together and adapted for receiving therebetween the distal edge of the associated duct wall, the other of said leg portions having spaced-apart flexible walls defining a channel therebetween open at the ends of said connector and respectively integral with said flexible flanges; a plurality of corner members respectively associated with the corners of both duct sections, each of said corner members having two legs respectively receivable in the channels of adjacent ones of said connectors at a corner of one of the duct sections, each of said corner member legs including holding means engageable with both sides of one of said flexible walls for preventing deflection thereof in either direction; and means connecting the corner members on one duct section respectively with the corresponding corner members on the other duct section for joining the duct sections.

10. The duct assembly system of claim 9, wherein said holding means comprises means for gripping one of said flexible walls.

11. The duct assembly system of claim 9, wherein said holding means includes two holding flanges respectively projecting laterally from said corner member legs of each of said corner members, each of said holding flanges having a gripping portion cooperating with the associated leg for grippingly receiving therebetween the adjacent end edge of said one of said flexible walls of the associated connector.

12. The duct assembly system of claim 11, wherein each of said corner member legs has a substantially flat planar body, each of said holding flanges being struck from the associated leg body, said gripping portion extending substantially parallel to said leg body.

13. The duct assembly system of claim 9, and further including locking means for interlocking said one leg portion of each of said connectors and the associated duct wall received therein.

14. The duct assembly system of claim 9, and further including gasket means disposed between adjacent ones of said connectors, wherein each of said connectors has a bearing portion at the junction of said leg portions and projecting outwardly beyond said other leg portion on the opposite side thereof from said one leg portion, said bearing portion on each of said connectors on one duct section bearing against the bearing portion of the opposite connector on the other duct section and cooperating therewith to define a pivot axis about which said other leg portions of said opposed connectors pivot toward each other as said corner members are drawn together by said connecting means thereby effectively to clamp said gasket means therebetween.

15. The duct assembly system of claim 9, wherein each of said connectors includes an inner wall integral with one of said flexible flanges at the inner end thereof, said inner wall and said one flexible flange diverging toward the space between said flexible flanges for cooperation to define a trough, and a soft deformable body of sealant material disposed in said trough, said inner wall being engageable with the distal edge of an associated duct wall for guiding said edge into said trough.

16. The duct assembly system of claim 9, wherein each duct section is rectangular in transverse cross section, said corner member legs being disposed substantially perpendicular to each other.

17. A generally L-shaped angle member connector for use in a duct assembly system to join adjacent duct sections, each having a plurality of duct walls terminating at distal edges and meeting at duct corners, said connector comprising: an elongated body having two flanges resiliently biased together and adapted for receiving therebetween the distal edge of an associated one of the duct walls, and a trough disposed in said body and extending the length thereof and having side walls diverging toward the space between said flanges, the diverging walls of said trough serving to guide the distal edge of the duct wall thereinto.

18. The angle member connector of claim 17, wherein one of said flanges has an elongated ridge thereon projecting inwardly toward the other of said flanges and having a longitudinal axis extending generally parallel to the distal edge thereof.

19. The angle member connector of claim 18, wherein said one flange has a plurality of said ridges thereon arranged parallel to each other.

20. The angle member connector of claim 18, wherein each of said flanges has at least one of said ridges thereon projecting inwardly toward the other one of said flanges.

21. The angle member connector of claim 17, and further including a soft deformable body of sealant material disposed in said trough and extending the length thereof for receiving therein the distal edge of the associated duct wall and cooperating with said trough for providing an air-tight seal between the duct wall and said body.

22. The angle member connector of claim 21, wherein said body includes a serpentine wall having a first portion cooperating with one of said flanges to define said trough and having a second portion cooperating with said first portion to define a channel opening away from said flanges, and a second body of sealant disposed in said channel.

23. The angle member connector of claim 17, wherein said flanges diverge at the ends thereof remote from said trough.

24. A corner member for use in a duct assembly system for joining two elongated connectors which are respectively coupled to intersecting duct walls of a duct section wherein each of said connectors has spaced-apart flexible walls defining a channel extending the length thereof and open at the ends thereof, said corner member comprising: a body having two legs respectively receivalbe in the channels of the two associated connectors, each of said legs including holding means adapted for gripping engagement with both sides of one of the walls of the associated connector for preventing deflection thereof in either direction.

25. The corner member of claim 24, wherein each of said legs comprises a substantially flat planar member, said holding means including a flange stuck from said member and having a gripping portion extending substantially parallel thereto.

26. The corner member of claim 24, wherein each of said legs has a bearing portion projecting laterally therefrom for inhibiting deflection of said walls toward each other.

27. The corner member of claim 24, wherein said body includes a circular opening therethrough and a part-circular embossment disposed substantially coaxially with said opening.

28. A duct assembly system for joining adjacent duct sections, each having a plurality of duct walls terminating at distal edges and meeting at duct corners, said system comprising: a plurality of elongated generally L-shaped angle member connectors respectively associated with the duct walls of both duct sections, each of said connectors including two generally perpendicular leg portions, one of said leg portions including two flexible flanges resiliently biased together and adapted for receiving therebetween the distal edge of the associated duct wall, the other of said leg portions having spaced-apart flexible walls defining a channel therebetween open at the ends of said connector and respectively integral with said flexible flanges; each of the duct walls having an elongated continuous rib projecting from the plane thereof and having a longitudinal axis spaced from and extending substantially parallel to the distal edge thereof and engageable with one of said flexible flanges of the associated connector upon insertion between said flexible flanges for interlocking the duct wall and said connectors; a plurality of corner members respectively associated with the corners of both duct sections, each of said corner members having two legs respectively receivable in the channels of adjacent ones of said connectors at a corner of one of the duct sections, each of said corner member legs including holding means engageable with one of said flexible walls for preventing deflection thereof; and means connecting the corner members on one duct section respectively with the corresponding corner members on the other duct section for joining the duct sections.

* * * * *